US008489142B2

(12) United States Patent
Fujimoto

(10) Patent No.: US 8,489,142 B2
(45) Date of Patent: *Jul. 16, 2013

(54) PORTABLE TELEPHONE AND COMMUNICATION MODE SETTING METHOD

(75) Inventor: Go Fujimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/479,249

(22) Filed: May 23, 2012

(65) Prior Publication Data

US 2012/0231783 A1    Sep. 13, 2012

Related U.S. Application Data

(63) Continuation of application No. 12/281,655, filed on Sep. 4, 2008, now Pat. No. 8,190,197.

(30) Foreign Application Priority Data

Mar. 10, 2006 (JP) ................................. 2006-065778

(51) Int. Cl.
*H04M 1/00*    (2006.01)
(52) U.S. Cl.
USPC ..................... 455/552.1; 455/452.2; 455/450; 455/452.1; 455/464; 455/436; 370/332; 370/312
(58) Field of Classification Search
USPC ................ 455/552.1, 452.2, 450, 452.1, 464, 455/436; 370/332, 312
See application file for complete search history.

(56) References Cited

U.S. PATENT DOCUMENTS

| | | | |
|---|---|---|---|
| 8,190,197 B2 * | 5/2012 | Fujimoto ................... | 455/552.1 |
| 2004/0229629 A1 * | 11/2004 | Yi et al. ..................... | 455/452.2 |
| 2005/0182995 A1 | 8/2005 | Curcio et al. | |
| 2005/0216812 A1 | 9/2005 | Leon et al. | |
| 2005/0246417 A1 * | 11/2005 | Raith et al. .................... | 709/203 |
| 2005/0285755 A1 | 12/2005 | Moon et al. | |
| 2007/0117518 A1 * | 5/2007 | Cai et al. .................... | 455/67.13 |
| 2007/0165551 A1 * | 7/2007 | Proctor et al. ................ | 370/312 |
| 2007/0293145 A1 | 12/2007 | Yahagi | |
| 2008/0076359 A1 * | 3/2008 | Charpentier et al. ........ | 455/63.1 |

FOREIGN PATENT DOCUMENTS

| | | |
|---|---|---|
| JP | 2001069444 A | 3/2001 |
| JP | 2004032335 A | 1/2004 |
| JP | 2006005786 A | 1/2006 |

OTHER PUBLICATIONS

European search report for EP07707698.2 dated Sep. 19, 2012.

(Continued)

*Primary Examiner* — Sanh Phu

(57) ABSTRACT

To realize a portable telephone which can always receive the user information via a MBMS service. The portable telephone includes: an antenna for transmitting/receiving radio waves to and from a network; a wireless section for modulating/demodulating radio waves transmitted/received by the antenna; and a control section which has a function of analyzing and processing Layer 3 messages including MBMS related messages demodulated by the wireless section and wherein, upon recognizing that there is user information which has not been received while receiving user information via a MBMS service in the PtM mode, the control section transmits a request to provide the MBMS service in PtP mode to the network via the wireless section.

4 Claims, 4 Drawing Sheets

OTHER PUBLICATIONS

Samsung et al: 11 Draft CR to 25.331 [Rel-6] to MBMS counting for UEs in Cell PCH, Cell FACH state and UE initiated p-t-p MBMS bearer establishment 11, 3GPP Draft; R2-050792, 3rd Generation Partnership Project (3GPP), Mobile Competence Centre ; 650, Route Des Lucioles ; F-06921 Sophia-Antipolis Cedex ; France, vol. RAN WG2, no. Beijing, china; 20050330, Mar. 30, 2005.

Japanese Office Action for JP2008-504997 mailed on Dec. 11, 2012. Siemens. Samsung, Addition of MBMS counting for UEs in Cell PCH and Cell FACH states and addition of UE requested p-t-p bearer establishment, 3GPP TSG-RAN2 Meeting #47, R2-051683, May 2005.

* cited by examiner

US 8,489,142 B2

PORTABLE TELEPHONE AND COMMUNICATION MODE SETTING METHOD

REFERENCE TO RELATED APPLICATION

This is a continuation application of U.S. patent application Ser. No. 12/281,655 filed Sep. 4, 2008 now U.S. Pat. No. 8,190,197 and claims the benefit of its priority.

TECHNICAL FIELD

The present invention relates to a portable telephone based on W-CDMA (Wideband-Code Division Multiple Access) scheme, particularly to a portable telephone for receiving MBMS (Multimedia Broadcast Multicast Service) services.

BACKGROUND ART

Portable telephones based on W-CDMA scheme perform communications in PtM (Point to Multipoint) mode in which one network communicates with multiple portable telephones by using a common channel, and perform communications in PtP (Point to Point) mode in which one network communicates with one portable telephone by using a separate channel.

MBMS (Multimedia Broadcast Multicast Service) disclosed by Patent Document 1 (National Publication of International Patent Application No. 2005-525065) and Patent Document 2 (National Publication of International Patent Application No. 2005-536142) is defined in 3GPP Specification TS25.331 etc. and is a function of delivering multimedia data such as videos, images, and sound. For the delivery of user information by MBMS, PtM mode is basically to be employed in order to efficiently use of radio wave power; however, PtP mode may also be used.

Patent document 3 (Japanese Patent Laid-Open No. 2002-368684) discloses that when the error in receiving multicast data through a common channel (FACH) corresponding to PtM mode occurs successively for more than a predetermined number of times, a mobile station requests a base station to set a separate channel (DCH) corresponding to PtP mode for retransmission, and the base station sets a DCH for retransmission in response to the request of the mobile station to retransmit data to be retransmitted by using the DCH for retransmission and monitors the reception status thereafter to restart the reception through a common channel.

Patent Document 1: National Publication of International Patent Application No. 2005-525065.

Patent Document 2: National Publication of International Patent Application No. 2005-536142.

Patent Document 3: Japanese Patent Laid-Open No. 2002-368684.

DISCLOSURE OF THE INVENTION

As described above, for the delivery of user information by MBMS, PtM mode is basically to be used. When a portable telephone comes into an out-of-range state during MBMS communication in PtM mode as a result of, for example, entering a tunnel, communication is temporarily disabled and information transmitted from the network cannot be obtained.

Thereafter, even if the portable telephone returns to a within-range state, since it is specified in the current 3GPP specification that if a retransmission period for user information from the network has expired, the mobile station cannot actively request retransmission during MBMS communication in PtM mode, a problem exists in that finally the user information cannot be received.

On one hand, when the technique described in Patent Document 3 is applied to the 3GPP specification, a mode shift to PtP mode will take place thereby enabling a retransmission request. However, with such configuration, although it is possible to obtain data by shifting to PtP mode, since a mode shift to PtM mode will take place thereafter, will occur in mountainous areas in which tunnels are located in close proximity to each other etc., and therefore there is a risk that the volume is communication traffic between the portable telephone and the network will increase thus causing congestion.

The present invention has been made in view of the above described problem in related arts, and its object is to realize a portable phone in which user information can always be received using MBMS service.

The portable telephone of the present invention comprises:
an antenna for transmitting/receiving radio waves to and from a network;
a wireless section for modulating/demodulating radio waves transmitted/received by the antenna;
a control section which has a function of analyzing and processing layer 3 messages including MBMS related ones demodulated by the wireless section and wherein, upon recognizing that there is user information which has not been received while receiving user information by a MBMS service in the PtM mode, the control section transmits a request for providing the MBMS service in PtP mode to the network via the wireless section, thereafter maintaining the reception of the MBMS service in PtP mode.

In this case, upon recognizing that there is user information which has not been received while being in RRC IDLE mode, and performing communication by a MBMS service in PtM mode, the control section transmits a RRC Connection Request message to the network and sets the information element, 'Establishment Cause,' of the RCC Connection Request Message to be a 'MBMS ptp RB request'.

Further, upon recognizing that there is user information which has not been received while being in Cell_PCH, URA_PCH, Cell_FACH mode, and performing communication by a MBMS service in PtM mode, the control section transmits a 'Cell Update' message to the network and sets 'Cell update cause' to be a 'MBMS ptp RB request' as an information element of the message.

The communication mode setting method according to the present invention is a communication mode setting method, which is performed in a portable telephone which receives a MBMS service from a network, and comprises:
a reception step wherein a MBMS service is received in PtM mode; and
a mode change step wherein when it is recognized that there is user information which has not been received while receiving user information via the MBMS service, a request for providing the MBMS service in PtP mode is transmitted to the network.

In this case, in the reception step, while in the RRC IDLE mode, communication is performed by a MBMS service in PtM mode; and in the mode change step, 'RRC Connection Request' massage may be transmitted to the network and an information element 'Establishment cause' of the message is set to be a 'MBMS ptp RB request'.

Further, in the reception step, while being in Cell_PCH, URA_PCH, Cell_FACH mode, communication is performed by a MBMS service in PtM mode; and in the mode change step, a 'Cell Update' massage may be transmitted to the network and a 'Cell update cause' is set to be a 'MBMS ptp RB request' as an information element of the message.

According to the present invention configured as described above, it is possible to always and quickly receive user information which has not be obtained in PtM mode, by requesting that communication in the network be in the PtP mode, thereby shifting from the PtM to the PtP mode, when returning to a within-range state and further maintaining the PtP mode, and there is an advantageous effect in which such a state can be continued without causing an increase in communication charge.

DESCRIPTION OF SYMBOLS

1 ANTENNA
2 WIRELESS SECTION
3 CONTROL SECTION
5 DISPLAY
11 PORTABLE TELEPHONE
20 NETWORK
21 CELL
101 MEMORY
102 KEYBOARD
103 SPEAKER
104 MICROPHONE

BEST MODE FOR CARRYING OUT THE INVENTION

Next, embodiments of the present invention will be described with reference to the drawings.

Figure 1:
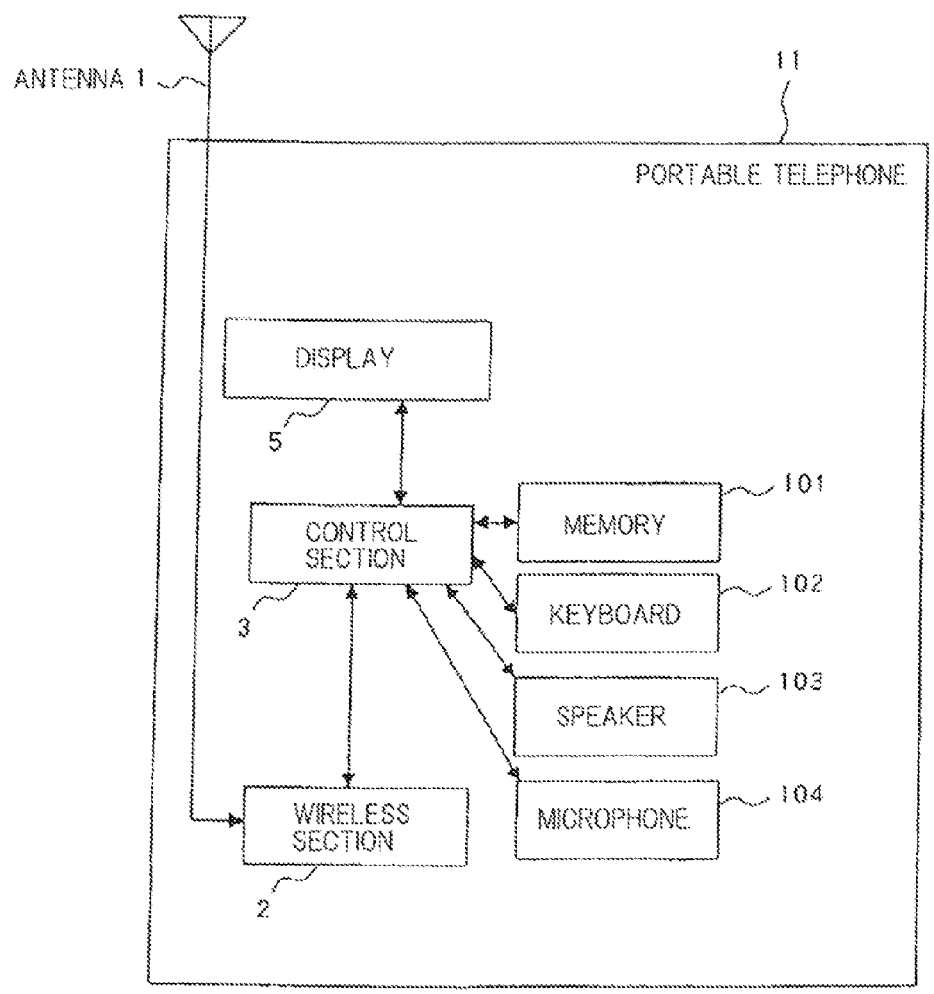
FIG. 1 is a block diagram showing the configuration of an embodiment of the portable telephone according to the present invention.

FIG. 1 is a block diagram to show the configuration of an embodiment of the portable telephone according to the present invention.

Portable telephone 11 of the present embodiment is made up of antenna 1 for receiving radio waves, wireless section 2 for modulating/demodulating radio waves, control section 3 for controlling data to be modulated and demodulated, display 5 for displaying data, memory 101 capable of storing/reading data, keyboard 102 for receiving input from a user, speaker 103 capable of outputting voice, and microphone 104 capable of inputting voices.

Wireless section 2 has a function of monitoring radio waves from network 20 made up of multiple base stations and notifying control section 3 of a reception status.

Control section 3 has a function of analyzing/processing Layer 3 messages such as RRC/MM including MBMS.

These respective sections operate as described below. Radio waves transmitted from network 20 are received by antenna 1; received radio waves which have been modulated into a RF signal are demodulated at wireless section 2; and messages to and from network 20 are analyzed and processed at control section 3. Display 5 provides a display which can be visually recognized by a user in response to control by control section 3.

Figure 2:
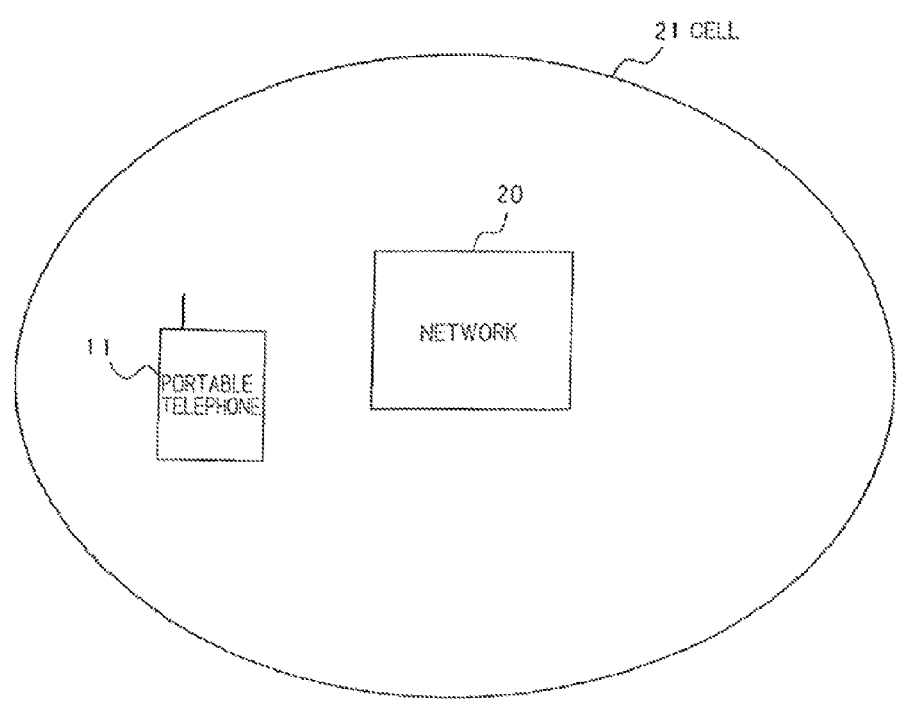
FIG. 2 shows the configuration of a system made up of a network and a portable telephone.

In FIG. 2, network 20 can transmit radio waves within the range of cell 21. Portable telephone 11 can freely move inside and outside cell 21. When portable telephone 11 is inside cell 21, it is a within-range state in which radio waves from network 20 can be received, and when portable telephone 11 is outside cell 21, it is an out-of-range state in which radio waves from network 20 cannot be received.

Figure 3A:
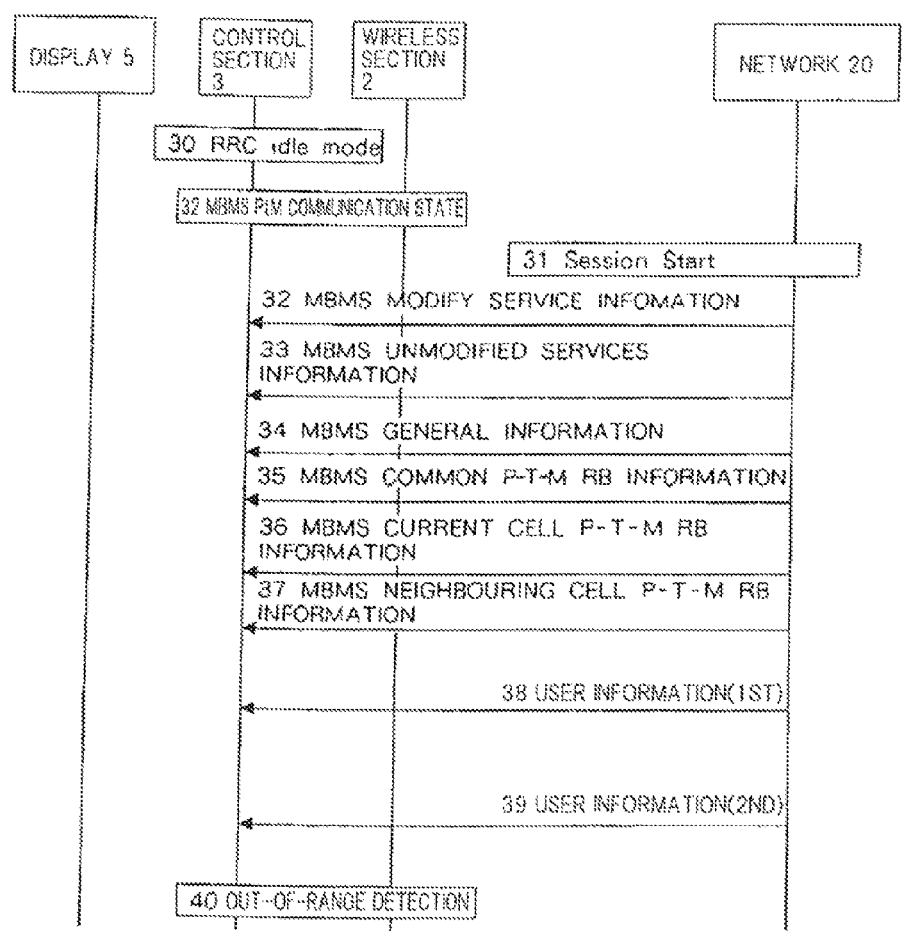
FIG. 3A is a sequence diagram showing the operation of an embodiment of the present invention.
Figure 3B:
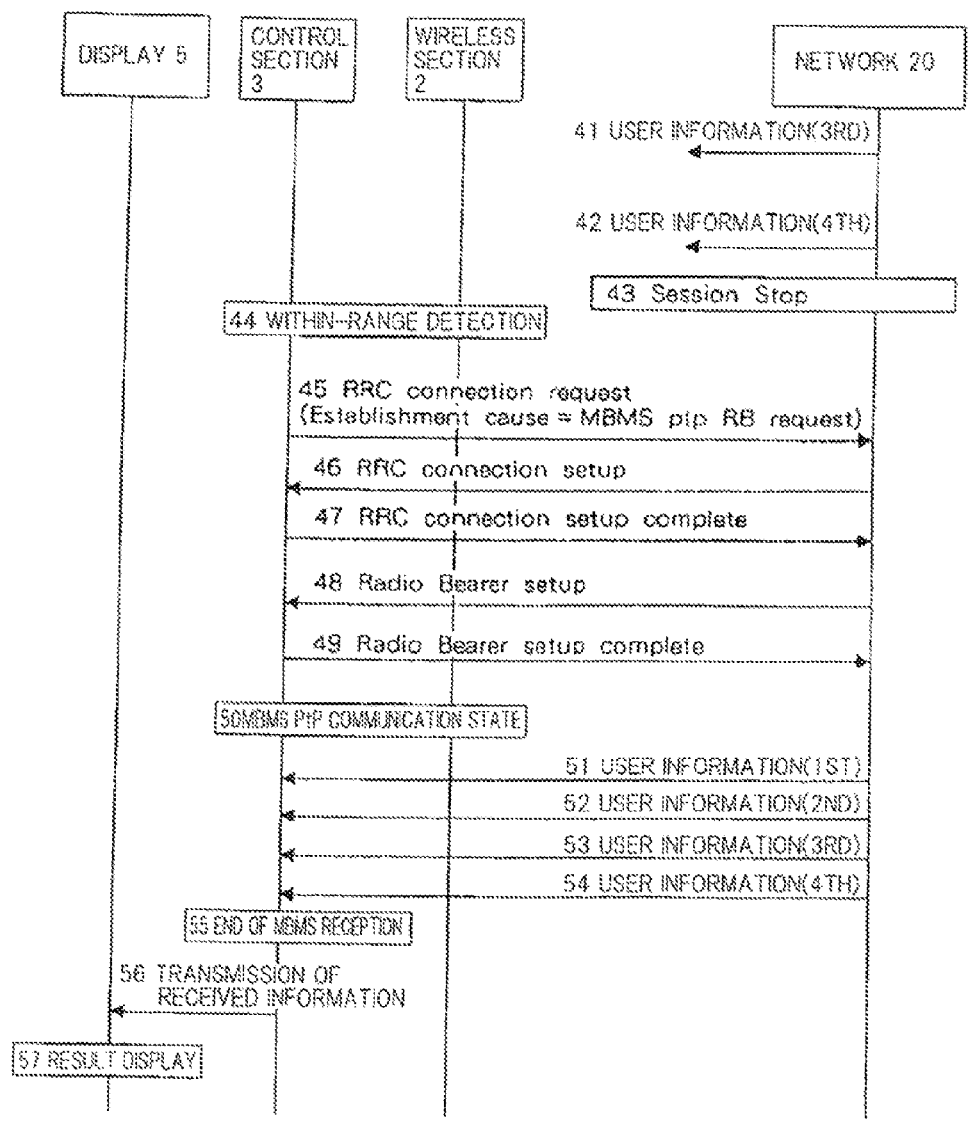
FIG. 3B is a sequence diagram showing the operation of the embodiment of the present invention.

FIGS. 3A and 3B are sequence diagrams to show a procedure in which, although network 20 transmits user information divided into quarters in PtM mode of a MBMS service, portable telephone 11 cannot receive part of user information and which requests that network 20 transmissions in the PtP mode thus requesting retransmission of the user information which has not been received.

Hereinafter, the operation of the present embodiment will be described with reference to FIGS. 3A and 3B.

Suppose that in step 30, control section 3 of portable telephone 11 is in the 'RRC idle mode' and in step 31, it is already in a state in which user information can be received via a MBMS in the PtM mode.

Network 20 starts a new Session in step 31. Network 20 transmits: a 'MBMS MODIFY SERVICES INFORMATION' massage to provide notification that the MBMS service in cell 21 has been modified in step 32; a 'MBMS UNMODIFIED SERVICES INFORMATION' message to provide notification about MBMS services that are available in cell 21 without modification in step 33; a 'MBMS GENERAL INFORMATION' message for notifying general information on MBMS reception in step 34; a 'MBMS COMMON P-T-M RB INFORMATION' message for providing notification about 'PtM Radio Bearer configuration' information which may be common to services provided in cell 21 and in a neighboring cell in step 35; a 'MBMS CURRENT CELL P-T-M RB INFORMATION' message for providing notification about 'PtM Radio Bearer configuration' that is used in cell 21 in step 36; and a 'MBMS NEIGHBOURING CELL P-T-M RB INFORMATION' message for providing notification about 'PtM Radio Bearer configuration' that is used in a neighboring cell of cell 21 in step 37, to portable telephone 11.

In step 38, the first quarter of user information divided into quarters is transmitted and received by portable telephone 11. In step 39, the second quarter of user information divided into quarters is transmitted and received by portable telephone 11. In step 40, portable telephone 11 becomes unable to receive radio waves from network 20 which is entering on coming into an out-of-range state.

In step 41, although the third quarter of the user information divided into quarters is transmitted, portable telephone 11 is in an out-of-range state and unable to receive that. In step 42, although the fourth quarter of the user information divided into quarters is transmitted, portable telephone 11 is in an out-of-range state and is unable to receive the user information.

In step 43, network 20 terminates the current Session. In step 44, portable telephone 11 becomes to be able to receive radio waves from network 20 that is entering a within-range state, and control section 3 recognizes that there is user information which has not been received.

In step 45, control section 3 of portable telephone 11 first transmits a 'RRC CONNECTION REQUEST' massage to network 20 to request user information which has not been received. At this moment, 'Establishment cause', which is an information element in the message, is set to be a 'MBMS ptp RB request' (in the current 3GPP specification, requesting PtP communication is not allowed unless instructed by the network).

Network 20 judges from 'Establishment cause' that retransmission of user information is requested. In step 46, network 20 transmits a 'RRC CONNECTION SETUP' message and in step 47, portable telephone 11 transmits a 'RRC CONNECTION SETUP COMPLETE' message so that a 'RRC CONNECTION' is established between portable telephone 11 and network 20.

In step 48, network 20 transmits a 'RADIO BEARER SETUP' message and in step 49, portable telephone 11 transmits a "RADIO BEARER SETUP COMPLETE" message so that 'RADIO BEARER' for PtP is established between portable telephone 11 and network 20.

Portable telephone 11 is shifted into a MBMS PtP communication state. In step 50, portable telephone 11 becomes able to receive user information via a MBMS service in PtP mode. In step 51 to step 54, network 20 retransmits the user information dived into quarters by using the established 'RADIO BEARER' for PtP. In step 55, control section 3 of portable telephone 11 recognizes that all of the information divided into quarters has been received, and assembles the user information into one piece. In step 56, control section 3 of portable telephone 11 transmits the user information to display 5 and in step 57, the display provides a display of the received user information.

Although description has been made such that control section 3 of portable telephone 11 is in 'RRC IDLE' mode in step 30 and, in step 45, transmits a 'RRC Connection Request' message to set an information element 'Establishment cause' in that message to be a 'MBMS ptp RB request', control section 3 may also be configured such that control section 3 of portable telephone 11 sets a 'Cell_PCH, URA_PCH, Cell_FACH' mode in step 30 and in step 45, transmits a 'Cell Update' message to set 'Cell update cause' to be a 'MBMS ptp RB request' as an information element of the message.

The invention claimed is:

1. A portable telephone, comprising:
   an antenna for transmitting/receiving radio waves to and from a network;
   a wireless section for modulating/demodulating radio waves transmitted/received by said antenna; and
   a control section which has a function of analyzing and processing layer 3 messages including MBMS related messages demodulated by said wireless section and wherein, said control section transmits a request for providing a MBMS service in PtP mode to said network via said wireless section, wherein
   while being in idle mode, and performing communication by a MBMS service in PtM mode, the control section transmits a RRC Connection Request message to the network and sets an information element 'Establishment cause' in that message to be a 'MBMS ptp RB request'.

2. A communication mode setting method, which is performed in a portable telephone which receives a MBMS service from a network, said communication mode setting method comprising:
   a reception step wherein a MBMS service is received in PtM mode; and
   a mode change step wherein a request for providing the MBMS service in PtP mode is transmitted to said network, wherein
   in the reception step, while in idle mode, communication is carried out by MBMS service in PtM mode; and
   in the mode change step, 'RRC Connection Request' message is transmitted to the network and an information element 'Establishment cause' in the message is set to be a 'MBMS ptp RB request'.

3. A portable telephone, comprising:
   an antenna for transmitting/receiving radio waves to and from a network;
   a wireless section for modulating/demodulating radio waves transmitted/received by said antenna; and
   a control section which has a function of analyzing and processing layer 3 messages including MBMS related messages demodulated by said wireless section and wherein, said control section transmits a request for providing a MBMS service in PtP mode to said network via said wireless section, wherein
   while being in Cell_PCH, URA_PCH, Cell_FACH mode, and performing communication by a MBMS service in PtM mode, the control section transmits a 'Cell Update' message to the network and sets 'Cell update cause' to be a 'MBMS ptp RB request' as an information element in the message.

4. A communication mode setting method, which is performed in a portable telephone which receives a MBMS service from a network, said communication mode setting method comprising:
   a reception step wherein a MBMS service is received in PtM mode; and
   a mode change step wherein a request for providing the MBMS service in PtP mode is transmitted to said network, wherein
   in the reception step, while being in Cell_PCH, URA_PCH, Cell_FACH mode, communication is carried out by a MBMS service in PtM mode;
   and in the mode change step, a 'Cell Update' message is transmitted to the network and a 'Cell update cause' is set to be a 'MBMS ptp RB request' as an information element in the message.

* * * * *